Nov. 14, 1961     E. O. STOVERN     3,008,210
SAFETY CRANE HOOKS
Filed Sept. 18, 1959

INVENTOR;
ELMER O. STOVERN.

BY *Robert M. Dunning*
ATTORNEY

United States Patent Office 3,008,210
Patented Nov. 14, 1961

3,008,210
SAFETY CRANE HOOKS
Elmer O. Stovern, 111 Yorkshire Road,
Hoyt Lakes, Minn.
Filed Sept. 18, 1959, Ser. No. 840,834
4 Claims. (Cl. 24—235)

This invention relates to an improvement in safety crane hooks and deals particularly with a crane hook which may be manipulated without danger of injury to the workman. Crane hooks used for the lifting of loads have been used for countless years. These hooks usually incorporate a swivel which enables the hook to be rotated about a vertical axis and often includes a latch which is normally biased across the bight of the hook by a suitable latch spring. The latch acts to prevent the disengagement of a ring, bucket bale or cable connected to the load to be lifted.

Due to the size and weight of the hook and of the size and weight of the members which are attached to the hook, many injuries are experienced during the act of attaching or detaching the load from the hook. In attaching the load, it is usually necessary to place the hand or hands about the shank of the hook to guide it through a ring, or under a bucket bale or cable. When the hook is equipped with a safety latch, it is necessary to use both hands for uncoupling the load from the hook, one hand being used to retract the latch while the other is used to guide the hook from the member to which it is attached. From time to time, the hands or fingers of the workers are caught between the hook and the member being coupled or uncoupled from the hook, and a painful and often permanent injury results.

A feature of the present invention resides in the provision of a hook having a handle attached thereto projecting rearwardly from the hook opposite the pointed end of the hook. This handle may be used in guiding the hook during the coupling and uncoupling operation. As the hand or hands of the worker are on the side of the hook opposite that in which the member to be coupled or uncoupled is received, the accidents which have been described may be eliminated.

A further object of the present invention lies in the provision of a handle pivotally attached to the hook latch and which straddles the shank of the hook and extends rearwardly thereof. This handle is preferably of U-shaped construction with the ends of the U-shaped member bent inwardly in opposed relation to engage opposite sides of the latch. The cross member of the handle is designed to extend over a suitable projection on the rear of the hook when the latch is drawn into open position. As a result, the latch may be held in an inoperable position during the operation of coupling or uncoupling the load, thereby permitting the load to be coupled or uncoupled without interference and without placing the hands in contact with the member being attached or detached.

These and other objects and novel features of the present invention will be more clearly and fully set forth in the following specification and claims.

In the drawings forming a part of the specification:

Figure 1:
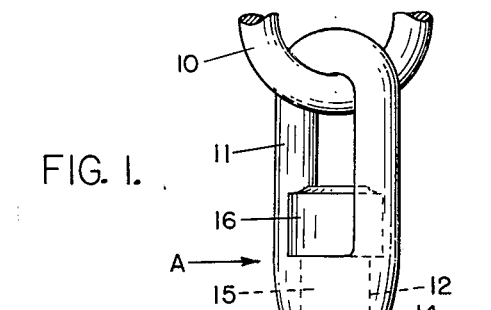
FIGURE 1 is a side elevational view of a hook and a load supporting member showing the hook latch in open or inoperative position.
Figure 3:
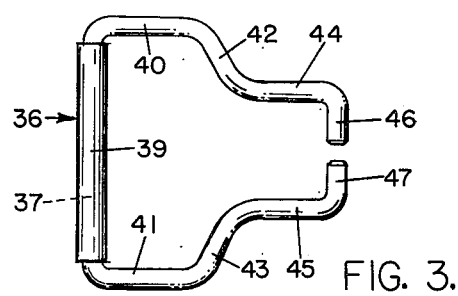
FIGURE 3 is a top plan view of the handle used for swinging the latch into or out of operative position.

The hook A is, for the most part, of conventional form and is normally suspended from a clevis 10 or other such support attached to a load line or load block in any suitable way. The hook A is shown as including a vertically elongated loop 11, the lower portion of which forms a vertical bearing having a vertical opening 12 extending therethrough.

The hook 13 is provided with a flange 14 near its upper end from which projects a vertical shank 15 which extends through the passage 12. The upper end of the shank 15 is held engaged in the bearing 12 by means of an enlarged head 16 secured to the upper end of the shank in any suitable manner.

A latch 17 is pivotally connected at 19 to the forward side of the hook body adjoining the flange 14, the pivot 19 extending normal to a plane through the center of the hook body. This latch 17 is swingable from an open position illustrated in FIGURE 1 of the drawings to a closed position shown in FIGURE 2 of the drawings, extending across the bight of the hook and engaging the inner surface of the hook near the hook point 20. This latch 17 is normally urged into the closed position shown in FIGURE 2 by a torsion spring encircling the pivot 19 or by any other suitable means, the spring not being shown in detail in the drawings but being shown in dotted outline at 21. The hook description to this point has been of a conventional type hook and obviously, the details of construction may be varied to some extent without changing the present invention.

Figure 4:
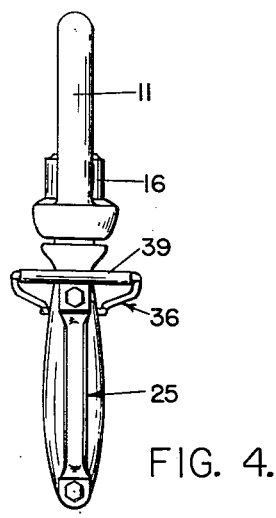
FIGURE 4 is a rear elevational view of the hook with the latch in latched position as shown in FIGURE 2.

The rear of the hook body is preferably provided with a pair of integral lugs or projections 22 and 23, these projections extending rearwardly from the hook body with the projection 22 near the top of the hook and the projection 23 near the bottom of the hook. The rear end 24 of these projections 22 and 23 are shown arranged in a common plane. A generally U-shaped handle 25 is attached to the rear side of the hook. This handle 25 includes a vertical center portion 26 which is preferably bent into concavo convex shape so that it may be more readily grasped by the hand. The upper and lower ends of the handle portion 26 are bent to form forwardly extending arms 27 and 29 which terminate in outwardly turned flanges 30 and 31 respectivley. Bolts 32 and 33 extend through these handle ends 30 and 31 and are threaded into sockets 34 and 35 in the lugs or projections 22 and 23. As is indicated in FIGURE 4 of the drawings, the handle 25 is centered relative to the body of the hook and provides a convenient means of guiding the hook during the hooking and unhooking operation.

Figure 2:
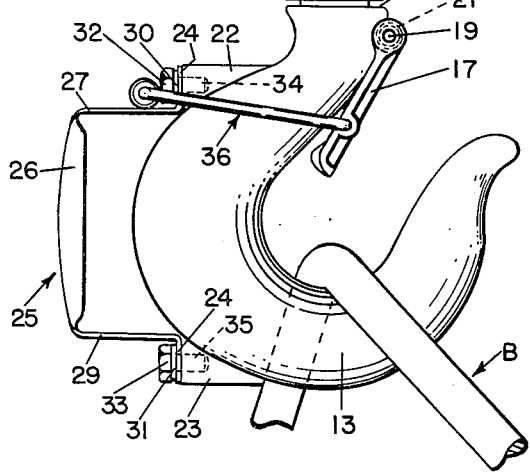
FIGURE 2 is a view similar to FIGURE 1 showing the latch in closed position.
Figure 2:
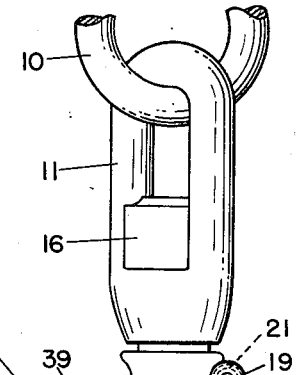
Figure 2:
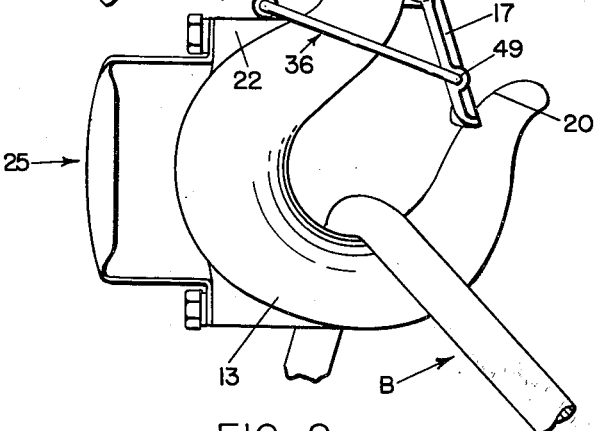

A latch handle which is illustrated in general by the numeral 36 is attached to the latch 17 and straddles the upper portion of the hook body. The handle 36 includes a cross member 37 upon which may be mounted a roller 39. Right angularly extending arms 40 and 41 project in parallel relation from the ends of the cross member 37. The arms 40 and 41 connect with inwardly diverging arm portions 42 and 43 which connect the parallel portions 40 and 41 with parallel portions 44 and 45 which are more closely spaced. The arms 44 and 45 terminate in inwardly turned extremities 46 and 47 which act as pivots for the handle 36. These ends 46 and 47 which are axially aligned extend into sockets 49 in a portion of the latch 17 near the free end of the latch. The sockets may be in the form of an aperture extending entirely through the latch 17. When the handle is in place, the various arm portions, which are all on a common plane, act to straddle the upper portion of the hook body with the roller 39 resting upon the upper surface of the lug 22 when the latch 17 is in its normal closed position as illustrated in FIGURE 2.

The operation of this portion of the device is believed obvious from the foregoing description. When the latch 17 is in the closed position shown in FIGURE 2, it may be swung into the open position shown in FIGURE 1 by merely pulling upon the handle 36 until the roller 39 passes over the head of the bolt 32 whereupon the cross member of the handle drops down into the latched position shown in FIGURE 1 of the drawings and in which position the latch is open. The hook is then guided into position the bucket bale B or other load supporting member by means of the handle 25 whereupon the handle 36 may be released to permit the latch 17 to swing into closed position shown in FIGURE 2.

While the handle 25 has been described as an addition to the crane hook and which is detachable therefrom, obviously this handle could be cast integrally with the hook if desired. In such an event, the latch handle would be engageable with a boss or shoulder on the hook, or with the handle itself.

In accordance with the patent statutes, I have described the principles of construction and operation of my improvement in safety crane hooks, and while I have endeavored to set forth the best embodiment thereof, I desire to have it understood that changes may be made within the scope of the following claims without departing from the spirit of my invention.

I claim:

1. A safety crane hook comprising a hook body having a hook shank and a hook point, a latch pivotally connected to said hook body adjacent to the hook shank and extending across the bight of the hook to the hook point, said latch being swingable between open and closed positions, a latch operating member comprising a rigid U-shaped member, said U-shaped member encircling the hook body and having its ends pivotally connected to said latch on its axis spaced from the pivotal connection of said latch to said hook body, a lug on said hook body projecting in a direction away from said latch, said lug terminating in a shoulder, the closed end of said U-shaped member overlying said lug in closed position of said latch, said closed end of said latch being engageable with said shoulder when said latch is in open position.

2. The structure of claim 1 and in which the closed end of said U-shaped member includes an encircling rotatable sleeve, whereby when said U-shaped member is moved to swing said latch toward open position, said sleeve may roll over the upper surface of said lug.

3. The structure of claim 1 and including a U-shaped handle secured at one end to said lug and at its other end to said hook body at a point longitudinally spaced from said lug.

4. A safety crane hook comprising a hook body having a hook shank and a hook point, a latch pivotally connected to said hook body adjacent to the hook shank and extending across the bight of the hook to the hook point, said latch being swingable between open and closed positions, a latch operating member comprising a rigid arm pivotally connected at one end to said latch on an axis parallel to and spaced from the axis of the pivotal attachment between said latch and said hook body, said arm including a portion overlying the surface of said hook body on the side thereof opposite the hook point and being generally parallel to said pivot axes, a rearwardly extending lug on said hook body over which said arm portion extends when said latch is in closed position, said lug terminating in a shoulder over which said arm portion may engage when said latch is in open position, said shoulder locking said latch in open position.

References Cited in the file of this patent

UNITED STATES PATENTS

| | | |
|---|---|---|
| 516,897 | McMillan | Mar. 20, 1894 |
| 1,193,516 | Clarke | Aug. 8, 1916 |
| 1,524,761 | Timbs | Feb. 3 1925 |
| 1,626,865 | Neilson | May 3, 1927 |
| 1,667,957 | Stevenson | May 1 1928 |
| 1,711,346 | Greve | Apr. 30, 1929 |
| 1,747,128 | O'Bannon | Feb. 11, 1930 |
| 2,246,630 | Johnson | June 24, 1941 |
| 2,492,991 | Hanna | Jan. 3, 1950 |
| 2,764,792 | Mansfield | Oct. 2, 1956 |